INVENTOR:
PATRICK P. COPPOLA,
BY Robert J. Mooney
HIS ATTORNEY.

3,155,864
DISPENSER CATHODE
Patrick P. Coppola, Fayetteville, N.Y., assignor to General Electric Company, a corporation of New York
Filed Mar. 21, 1960, Ser. No. 16,593
5 Claims. (Cl. 313—346)

The present invention relates to cathodes and more particularly to thermionic cathodes of the metal matrix dispenser type.

Metal matrix dispenser cathodes, i.e. cathodes containing emission material such as alkaline and alkaline earth metal compounds distributed within a matrix of metal, have certain well-recognized advantages such as self-replenishment and increased resistance to ion bombardment, and increased electrical conductivity. However, it appears that a metal matrix dispenser cathode wherein the matrix metal is inert to the emission material, i.e. consists of a metal such as nickel which is chemically unreactive with the emission material, apparently functions as an emitter in the manner of an oxide-coated cathode. That is, it appears that the exposed surface of the inert matrix metal of such a dispenser cathode effectively subtracts from the over all emission area because it itself has a relatively high work function, and the emission material of relatively low work function does not migrate to any extent across the bare surface of the inert matrix metal.

On the other hand, some of the metals most useful in cathodes from the standpoint of cost, refractory characteristics, and enhanced adsorption affinity for emission materials, and which do promote migration of adsorption coupled monomolecular layers or films of emission material, such as tungsten, molybdenum, and rhenium, are apt to undesirably react chemically with certain desirable emission materials if used as a matrix metal. Such chemical reactions typically result in severe and undesired depletion of the amount of emission material available to sustain emission. For example, tungsten reacts with barium carbonate to form barium tungstate, which is non-emissive. Hence any barium thus captured by the tungsten is lost to the emission process.

While metals of the platinum group, such as platinum, palladium and iridium, promote adsorption migration of emission material and do not react unfavorably with it, the use of such metals is objectionable from the standpoint of cost, and they have a decreased capability for reducing emission material to an activated state.

Briefly, the present invention resides in the provision of a cathode having an emission substrate layer of metal which has enhanced adsorption affinity for emission material such as alkaline and alkaline earth metals and oxides thereof and thus promotes monolayer surface migration of adsorbed emission material, and a metal matrix reservoir of emission material beneath the emission substrate layer, the reservoir being so constituted as to substantially preclude emission material-depleting chemical reaction between the migration-promoting metal and the emissive material during either cathode activation or subsequent life.

Thus, in accordance with the present invention I provide an improved emitter which has all the self-replenishment and ion bombardment-protection advantages of an inert metal matrix dispenser cathode yet provides exposed metal surfaces on which migration of emission material and formation of monomolecular film emission layers is promoted, so as to produce increased emission area and hence increased emission current for a given size cathode.

Accordingly, a principal object of the present invention is to provide an improved cathode in which the cathode activation process is accompanied by a minimum of undesired chemical side-reactions involving depletion of emission material.

Another object of the invention is to provide a metal matrix dispenser cathode having an emission surface of improved smoothness and precision of surface configuration.

Another object is to provide a metal matrix dispenser cathode of the foregoing character having an emission surface of essentially metallic nature providing relatively low electrical resistance and capable of loading to high current densities in comparison with non-metallic emission surfaces such as alkaline earth oxide-coated cathodes.

Another object is to provide a metal matrix dispenser cathode having a metallic emission substrate particularly suitable for enhancing adsorption affinity and promoting surface migration of adsorbed monomolecular films of emission materials such as alkaline metals and alkaline earth metals and oxides thereof.

These and other objects of the invention will be apparent from the following description in conjunction with the accompanying drawing, wherein.

Figure 1:
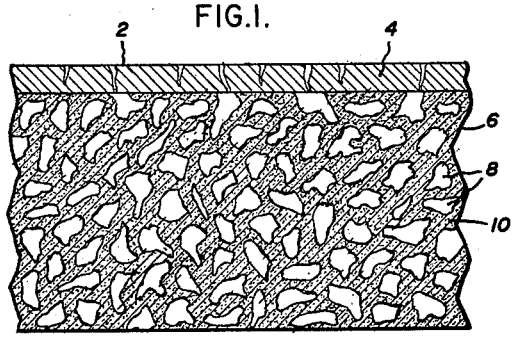
FIG. 1 is an enlarged fragmentary view of one form of cathode constructed according to my invention.

Turning to the drawings, FIG. 1 shows an example of one type of cathode constructed in accordance with my invention. The cathode has an emission surface 2 defined by an emission substrate layer 4 which is porous and consists of a material which is compatible with and promotes migration onto its exposed surface of a monolayer of adsorbed emission material. The emission substrate layer may include, for example, metals having enhanced emission material adsorption capability such as those taken from the class consisting of tungsten, molybdenum, rhenium, and metals of the platinum group of the periodic table such as platinum, palladium, ruthenium, osmium, rhodium, and iridium, and their alloys and intermetallic compounds thereof.

Beneath the emission substrate layer is a reservoir portion 6 consisting of finely divided emission material 8 distributed or dispersed within a matrix metal 10 inert or chemically unreactive with the emission material. The matrix metal may include, for example, one or more metals taken from the class consisting of nickel, cobalt, chromium, or niobium, and the emission material may be one or a mixture of metals taken from the class consisting of the alkaline earth metals, alkali metals, rare earth metals, or oxidizing compounds thereof whose anions are classified in Group VI of the periodic table. For example the emission material may be in the inactivated form as one or a mixture of the carbonates, nitrates, hydroxides or acetates of barium, strontium or calcium. The emission substrate layer may be applied to the reservoir by evaporation, electrodeposition, electrophoresis, spraying, brushing powder metallurgy techniques or the like.

To make the cathode shown in FIG. 1 the reservoir portion is formed from a mixture of the matrix metal constituent 10, e.g. nickel, and the emission material constituent 8, e.g. barium carbonate, both constituents being in finely divided form, plus a suitable conventional reducing activator for the carbonates such as, for example, a nitride or hydride of a metal taken from the class consisting of zirconium, titanium, or hafnium. As will be apparent to those skilled in the art, the reducing activator may also be directly alloyed with or present as an impurity in the nickel. This mixture may be compressed into a suitable tablet and mounted on a suitable support such as by insertion in one end of a sleeve of inert metal such as nickel. On top of the reservoir portion the emission substrate layer 4 is then formed, for example by evaporation of palladium from a hot tungsten filament in vacuum to a thickness of approximately one tenth to one half mil. Subsequent firing of the structure thus formed, in vacuum or a suitable non-oxidizing atmosphere, as for example by heat treating for 2 to 3 minutes at a temperature of about 1100–1300° centigrade, reduces the emission material to the metallic and metallic oxide forms thereof, as well as insuring suitable porosity of the emission substrate layer. During subsequent operation of the cathode, the alkaline earth metal and metal oxide emission material migrates through the interstices of the matrix reservoir and pores of the emission substrate layer and onto the surface of the emission substrate layer, and there forms an adsorbed metallic layer of monomolecular thickness which provides the source of emission.

Figure 2:
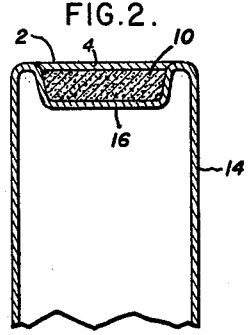
FIG. 2 is another view of a cathode similar to that of FIG. 1.

FIG. 2 is a specific example of a cathode of the type shown in FIG. 1. The support is a nickel sleeve 14 closed at one end by a wall 16 having a cup-shaped recess of about 15 mils depth and 100 mils diameter. Into the recess is pressed, at a pressure of about 80 tons per square inch, a reservoir 16 consisting of a mixture of about 73% by weight of powdered nickel matrix metal, about 25% by weight of barium-strontium-calcium carbonate, and about 2% by weight of zironium hydride activating agent. On top of the reservoir is then formed an emission substrate layer 4 consisting of palladium deposited to a thickness of about one tenth to one half mil by vacuum evaporation from a tungsten filament. The resulting structure is then fired in vacuum at a temperature of about 1200° C. for about three minutes to break down the carbonates to oxides and free alkaline earth metals, whereupon it is ready for use as an emitter.

It has been found experimentally that a cathode constructed as above-described will provide an increase in pulsed emission current density of more than 20% over that obtainable from a metal matrix dispenser cathode which does not have an emission substrate layer as herein described. Also well resolved or focused emission micrographs of the cathode surface projected on a phosphor screen show that with such a cathode as above-described, using palladium on nickel, the overall area providing emission current is increased substantially.

Figure 3:
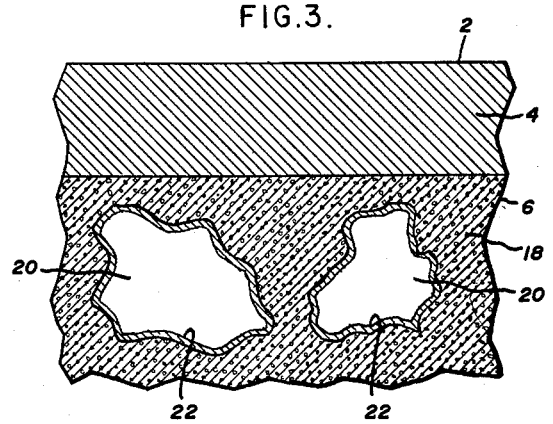
FIG. 3 is an enlarged view of another form of cathode according to my invention.

Another example of a cathode constructed in accordance with my invention is shown in FIG. 3. Like FIG. 1, the cathode of FIG. 3 includes a reservoir portion 6 covered by an emission substrate layer 4. The reservoir of the cathode of FIG. 3 is similar to that of FIG. 1 except that the matrix metal 18 is a metal of the non-inert and migration promoting type mentioned earlier, such as tungsten, and the emission material 20 is a compound of alkaline metal or alkaline earth metal or rare earth metal which reacts chemically with the matrix metal in such a way as to preclude formation of free alkaline metal, alkaline earth metal, or rare earth metal, respectively. Such compounds are hereinafter referred to as "oxidizing" compounds. In accordance with the invention, I temporarily prevent undesired chemical reaction between the matrix metal 18 and the emission material constituents of the reservoir during the heat treatment of the cathode by coating the particles of one or both of the constituents with a suitable barrier or isolating coating 22 which temporarily substantially prevents physical association and thus precludes chemical reaction of the matrix metal with the emission material constituents. Such a coating may consist of a relatively inert metal such as one or more of the metals taken from the class consisting of platinum, palladium, rhodium, iridium, gold, or alloys or intermetallic compounds thereof, or a compound which is nonreactive with the emission material such as magnesium oxide or the rare earth oxides.

This barrier or isolating coating 22 may be applied for example by evaporation, electrodeposition, dipping, and the like, and prevents chemical reaction of the emission material constituent with the matrix metal constituent of the reservoir, at least until the emission material constituent is reduced to activated form. During the heat treatment by which the emission material constituent 20 is raised to a temperature sufficient to dissociate its oxidizing constituents, such as carbon dioxide, and reduce it to metallic and metallic oxide, the isolating layer remains intact long enough, or to a temperature high enough, so that most of the oxidizing constituents of the emission material are driven off as gases before the isolating layer breaks down. The isolating layer then dissolves into the matrix metal or otherwise becomes discontinuous, so that a final state is realized in which the remaining elements of the emission material come into intimate contact with particles of matrix metal, and the emission material is thereby reduced to metallic and metallic oxide form.

Figure 4:
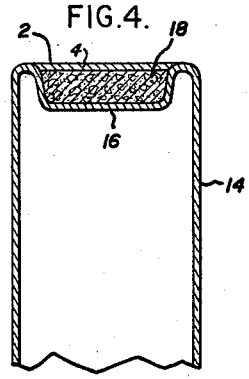
FIG. 4 is another view of a cathode similar to that of FIG. 3.

FIG. 4 shows a specific example of a cathode of the type shown in FIG. 3. Into the cup-shaped cavity of a nickel or molybdenum sleeve such as shown in FIG. 2 there is pressed, at a pressure of about 80 tons per square inch, a reservoir of about 10% by weight of barium-strontium-calcium carbonate emission material 20 in a matrix 18 of about 90% by weight of powdered tungsten and preferably 1 or 2% by weight of a reducing agent such as zirconium hydride. The individual particles of the tungsten powder are previously thinly and completely coated with a barrier coating 22 of platinum by bathing the powder in a platinum metal solution such as "platinum bright," drying, and firing in a reducing atmosphere to decompose the platinum solution and form elementary platinum which wets and completely encases the tungsten particles. On top of the reservoir is formed an emission substrate layer 4 of tungsten applied as a powder to a thickness of about 1 mil and pressed in place with a pressure of about 80 tons per square inch. The resulting structure is then fired in vacuum for about two to three minutes at a temperature of about 1300° C. to produce the desired reduction of the emission material constituent, and is then ready for use as an emitter.

As one measure of the advantages of cathodes prepared as described in connection with FIG. 4, it has been found experimentally that when the tungsten particles are uncoated, saturated pulsed emission densities of only a few milliamperes/cm.$^2$ are available at a temperature of 950° C.; however, use of platinum coated tungsten particles in the matrix provides an increase in emission density at 950° C. of about three orders of magnitude, namely about 1 ampere per cm.$^2$.

Figure 5:
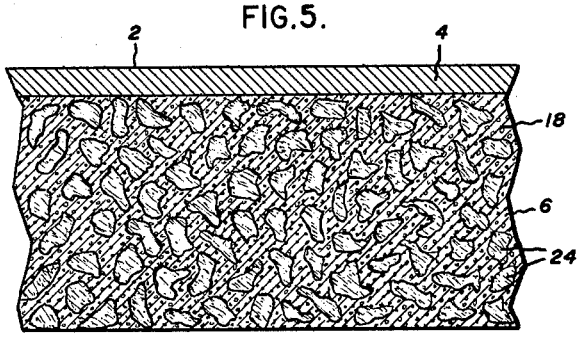
FIG. 5 is still another form of cathode constructed according to my invention.

Another form of cathode constructed according to the invention is shown in FIG. 5. Like FIG. 1, the cathode of FIG. 5 includes a reservoir portion 6 covered by an emission substrate portion 4, but in the cathode of FIG. 5 the matrix metal of the reservoir is of the migration promoting non-inert type as in FIG. 3. However, the emission material constituent is such as not to react with the matrix metal during the reduction or activation heat treatment in such a way as to trap the emission material action by chemical combination wiht the matrix metal, and thereby cause an undesired depletion of activated emission material. Such emission material constituents may consist for example of the alkaline metal and alkaline earth metal compounds which do not react with the matrix metals in such a way as to preclude formation of free alkaline metal or alkaline earth metal, hereinafter referred to for convenience as "non-oxidizing" compounds, such as the alkaline earth aluminates, titanates, zirconates, beryllates, silicates, borates, niobates, molybdates.

Thus it will be evident that cathodes are provided, according to the present invention, which combine all of the advantages of ion bombardment protection and self replenishment features of conventional dispenser cathodes, with the advantages of enlarged emission area and reduced emission density resulting from surface monolayer migration of emission material, while utilizing reservoir matrix metal constituents of unobjectionable cost and minimizing undesired depletion of emission material by chemical side reactions during activation.

It will be appreciated by those skilled in the art that the invention may be carried out in various ways and may take various forms and embodiments other than those illustrative embodiments heretofore described. It is to be understood that the scope of the invention is not limited by the details of the foregoing description, but will be defined in the following claims.

What I claim as new and desire to secure by Letters Patent of the United States is:

1. A thermionic electron emitter having an emission substrate layer comprising a continuous porous mass of a metal from the class consisting of the metals tungsten, molybdenum, rhenium, platinum, palladium, rhodium, iridium, ruthenium, osmium, and alloys and intermetallic compounds thereof, and a reservoir contiguous to the emission substrate layer comprising a matrix constituent and an emission material constituent, said matrix constituent comprising particles of a metal, and said emission material constituent comprising in the inactive state particles of a material of the class consisting of compounds of alkali metals, alkaline earth metals, and rare earth metals, and a heat destructible coating of a barrier material on the particles of one of said constituents for temporarily preventing chemical reaction of the molecules of said one of said constituents with the molecules of the other of said constituents during heat treatment.

2. A thermionic electron emitter as defined in claim 1 wherein said coating comprises a material of the class consisting of magnesium oxide, rare earth oxide and mixtures thereof.

3. A thermionic electron emitter having an emission substrate layer comprising a continuous porous mass of a metal from the class consisting of the metals tungsten, molybdenum, rhenium, platinum, palladium, rhodium, iridium, ruthenium, osmium and alloys and intermetallic compounds thereof, and a reservoir contiguous to the emission substrate layer comprising a matrix constituent and an emission material constituent, said matrix constituent comprising particles of a metal, and said emission material constituent comprising in the inactive state particles of a material of the class consisting of compounds of alkali metals, alkaline earth metals, and rare earth metals, and a heat destructible coating of a barrier material on the particles of one of said constituents for preventing chemical reaction of the molecules of said one of said constituents with the molecules of the other of said constituents during heat treatment, said coating consisting of a metal of the class consisting of platinum, palladium, rhodium, iridium, gold, ruthenium, osmium, and alloys and intermetallic compounds thereof.

4. The method of making a dispenser cathode comprising forming a quantity of a first constituent from the class consisting of particles of alkaline metal, alkaline earth metal and rare earth metal compounds reducible respectively to alkaline metals, alkaline earth metals, rare earth metals and oxides thereof, forming a quantity of a second constituent consisting of particles of a metal of the class including tungsten, molybdenum, rhenium, and alloys and intermetallic compounds thereof, forming a coating of a barrier material on the particles of one of said constituents preventing intimate association of the molecules of said one of said constituents with the molecules of said other of said constituents, providing a dispersion of said first constituent in a matrix of said second constituent, and heating the resulting mass sufficiently to remove said barrier material and to reduce said first constituent to metallic and metallic oxide forms thereof.

5. A thermionic electron emitter as defined in claim 1 wherein said emission material constituent further includes a reducing agent comprising a material of the class consisting of nitrides and hydrides of zirconium, titanium and hafnium.

References Cited in the file of this patent

UNITED STATES PATENTS

| | | |
|---|---|---|
| 2,131,204 | Waldschmidt | Sept. 27, 1938 |
| 2,700,000 | Leir | Jan. 18, 1955 |
| 2,722,626 | Coppola | Nov. 1, 1955 |
| 2,808,531 | Katz | Oct. 1, 1957 |
| 2,902,620 | Winter | Sept. 1, 1959 |